United States Patent Office 3,395,203
Patented July 30, 1968

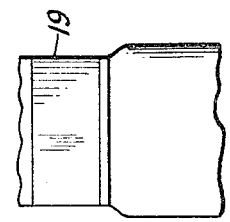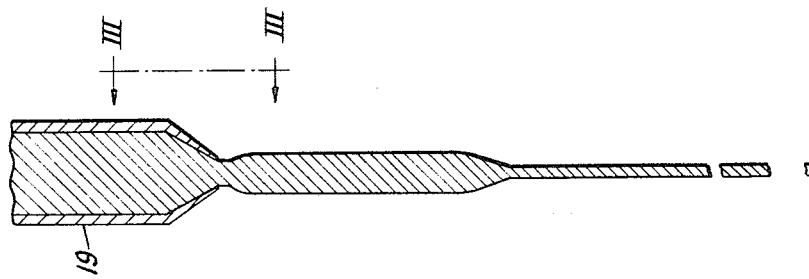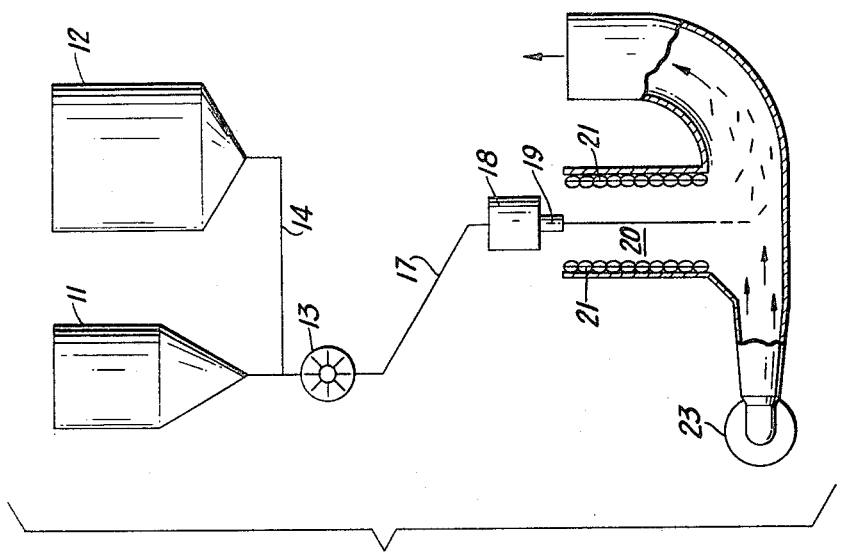

3,395,203
METHOD OF MAKING TITANIUM DIOXIDE NACREOUS PIGMENT
Yoshio Morita, Tokyo, Japan, assignor to Koppers Company Inc., a corporation of Delaware
Filed July 5, 1966, Ser. No. 562,640
Claims priority, application Japan, July 6, 1965, 40/40,113
8 Claims. (Cl. 264—141)

This invention relates to a new method of making nacreous pigments characterized by high heat stability, high sulfur resistance, good light stability, and other valuable physical and chemical properties. In one specific aspect, it relates to a method of preparing thin, lustrous flakes or platelets of titanium dioxide suitable for use in nacreous compositions.

The most commonly used synthetic nacreous pigments are those made from lead salts, such as basic lead carbonate. Unfortunately, lead carbonate pigments are limited to some extent in their use because of toxicity and their tendency towards sulfur staining. The lead salts are stable only up to a temperature of about 300° C. and, when used in nacreous compositions, they show a tendency towards sedimentation. Bismuth salts have been used for special purposes where non-toxicity is required, but the use of these salts is relatively rare because of their tendency to change to a gray color upon exposure to sunlight.

For many years titanium dioxide has been considered to be an excellent substance from which to make nacreous pigments of superior characteristics. Many attempts have been made to provide an economical process for the production of such pigments by preparing the titanium dioxide in the form of thin, lustrous flakes or platelets. The essential difficulty involved in devising such a process is that titanium dioxide does not crystallize as platelets or flakes. It has, therefore, been necessary to devise special methods to produce thin platelets of titanium dioxide from titanium salts, such as titanium tetrachloride, and lower alkyl titanium esters. There are two generally known methods of making the thin titanium dioxide platelets or flakes. One of these methods involves coating a flat surface of a substrate with a thin film of titanium compound and stripping the film from the surface. The titanium compound is oxidized to the dioxide. The other method involves coating a thin, plate-like substrate of a crystalline material, such as mica, with a thin film of titanium compound, which is oxidized to the dioxide. Using this method the substrate becomes a component of the resulting pigment. An example of the first method is the process described in Japanese Patent SHO 30–4731, published July 9, 1955, wherein an alcoholic solution of titanium tetrachloride is deposited on a soluble substrate, dried, oxidized, and thereafter removed by dissolving the substrate. It is also known to use an endless belt of metal as a substrate and a solution of tetrabutyltitanate as the initial titanium compound to form a thin film of titanium dioxide on the belt by coating the surface with the solution, and thereafter heating and removing the film. An example of the second method involves coating the surface of mica with titanium dioxide films, as described in U.S. Patent 3,087,828.

One known method of preparing titanium dioxide nacreous pigments not involving the use of a substrate is described in Japanese Patent SHO 35–15579. The method comprises making a foam from a solution of tetrabutyltitanate, drying the foam into a solid sponge, heating to produce titanium dioxide, and crushing the solidified solid sponge into flakes. In this method a meniscus is formed along the border line of each foam cell, which results in platelets having irregular surfaces.

I have discovered a novel method which eliminates the problem of surface irregularities and does not involve the use of any substrate. My new method is based on the instant drying of a free-flowing film of a dilute solution of titanium tetrachloride or a lower alkyl titanium ester. Upon drying and heating at high temperatures, the titanium salt is converted to titanium dioxide in the form of thin, lustrous flakes or platelets that are useful in the preparation of nacreous compositions by suspending the platelets in a suitable lacquer, such as nitrocellulose.

In accordance with the invention, thin, lustrous flakes of titanium dioxide are made by forming a dilute solution in a volatile solvent of a titanium compound, such as titanium tetrachloride or a lower alkyl titanium ester, which can be readily oxidized to titanium dioxide. The solution is forced under super-atmospheric pressure through a rectangular restriction, such as a slit nozzle, to form a thin, free-flowing film. Heat is instantaneously applied from the surrounding space to both sides of the film to heat the film to a temperature at which the solvent vaporizes to evaporate the solvent and form a solid film. The solid film is broken up and thereafter calcined to form thin, lustrous flakes of titanium dioxide of the proper optical thickness to produce a nacreous or pearlescent effect.

The method of my invention is more clearly understood from the accompanying drawings in which:

FIG. I is a schematic representation of an apparatus for carrying out the invention, FIGURE II is a side view of a slit nozzle used in the arrangement of FIG. I, and FIG. III is a front view of a portion of the same nozzle taken across at section III—III.

Referring to FIG. I, a concentrated solution of a suitable titanium compound, for example, an aqueous solution of titanium tetrachloride, is placed in tank 11. Pure water is stored in tank 12. The concentrated solution from tank 11 is diluted in mixer 13 by water supplied from tank 12 through line 14. Direct dissolution of titanium tetrachloride into a large amount of water results in hydrolysis. It is therefore necessary to prepare the titanium tetrachloride of the desired concentration immediately before use by diluting with pure water at mixer 13. The dilute solution in mixer 13 is carried by line 17 to reservoir 18. The solution is fed continuously through reservoir 18 to slit nozzle 19. Pressure is applied to the solution either as a result of a hydrostatic head or mechanically by a pump (not shown). The dilute solution of titanium tetrachloride is forced through slit nozzle 19 as a free-flowing film. Heat is applied to both sides of the film in chamber 20 by infrared heaters 21. The water is evaporated almost instantaneously to form a solid film of a hydrated product of titanium. The solid film is broken into flakes by the shrinkage of the film and the forced air supplied from fan 22. The thin flakes are transported to a cyclone collector (not shown), recovered, and calcined to provide the thin, lustrous flakes or platelets of the desired particle size.

The quality of the nacreous flakes or platelets produced according to the invention depends upon the concentration of the solution used to form the film; the choice of solvent; the thickness of the free-flowing film, which in turn depends upon the pressure applied to the solution, the width of the opening in the slit nozzle, and the rheological properties of the solution; and the temperature at which the free-flowing film is heated in order to evaporate the solvent and form the solid film.

The best quality of nacreous titanium dioxide pigment showing the highest luster should have an optical thickness (thickness in m$\mu$ times index of refraction) of less than about 100 m$\mu$. Every flake or platelet should be characterized by a very flat, smooth surface. Flakes of lesser quality are those which have an optical thickness of greater than 300 mμ. Such flakes show weak interference colors under a microscope and are somewhat inferior in luster. These flakes are, however, useful as pigments for thermoplastics, such as polyethylene and polystyrene, in which a lower degree of luster is sufficient. The flakes or platelets obtainable according to the method of the invention, depending upon the conditions used during their preparation, have an optical thickness ranging between 30 and 1000 mμ.

Titanium salts useful in the method of the invention include titanium tetrachloride and the lower alkyl esters of titanium, such as tetraethyltitanate, tetraisopropyltitanate, tetrabutyltitanate, and those partial esters formed by dissolving titanium tetrachloride in alcohol, such as

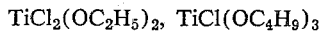

and the like. The titanium esters also exist in polymeric form and can be used in the invention as such.

The process described in connection with the drawing shows the use of water as a solvent for titanium tetrachloride. Using aqueous solutions, it is extremely difficult to produce a very thin platelet having an optical thickness of 30–100 mμ. From aqueous solutions most of the flakes or platelets obtained have an optical thickness of greater than 300 mμ and are used, as mentioned above, in those applications in which a lower luster is sufficient. The smaller platelets of the invention are made from a solution of a volatile organic solvent having a boiling point below 120° C. Examples of such solvents include the lower alkanols, such as ethyl alcohol, isopropyl alcohol, t-butyl alcohol; aliphatic hydrocarbons, such as petroleum ether, pentane, and n-hexane; cycloaliphatic hydrocarbons, such as cyclohexane; ketones, such as methylethyl ketone; and esters, such as ethyl acetate. Azeotropic mixtures, such as benzene-alcohol mixtures, are also useful as solvents. Using alcoholic solutions of titanium compound, irridescent flakes of interference colors ranging from yellow to blue-green are obtained. From highly volatile solvents, such as n-hexane and cyclohexane, very thin flakes having an optical thickness of below 100 mμ are easily made.

The concentration of the titanium compound in the volatile solvent is of particular importance in determining the thickness of the free-flowing film. It is impossible to measure the exact thickness of the free-flowing film, but, depending upon the concentration of the solution, the pressure applied, and the width of the opening of the slit nozzle, it can be estimated that the film ranges in thickness between about 0.01 and 0.1 mm. From a film having a thickness of about 0.02 mm., the ultimate optical thickness of the platelets made according to the invention ranges between 100 and 500 mμ.

To produce a free-flowing film of the proper thickness the concentration of the titanium compound in solution should range between about 0.1 and 5 percent by weight. The more dilute solutions are advantageous in providing thinner films, but the lower concentration of titanium compound causes difficulty during the drying step because of the large amount of solvent to be removed in a very short period of time. Also, the use of solutions of lower concentration tends to produce colloidal by-products. Nevertheless, the thinner free-flowing films provide better luster in the resulting titanium dioxide flakes. The tendency to produce colloidal material can be eliminated to a certain degree by acidifying the solution with a small amount of sulfuric acid or other suitable acid. Acceptable thin films can be produced from more concentrated solutions of about 2–5 percent by weight titanium compound by increasing the amount of pressure applied to the solution as it goes through the slit nozzle and narrowing the opening of the nozzle.

As noted above, the pressure can be applied to the solution either by using hydrostatic pressure or mechanical pressure supplied by a pump. The amount of pressure used depends upon the concentration of the solution and the width of the opening of the slit nozzle. Pressures ranging between 1 and 15 kg./cm.² are suitable for use in the invention. The clearance or opening of the slit nozzle should preferably be less than 0.1 mm., although the lowest acceptable quality of nacreous pigment can be made using a nozzle having an opening of up to 1 mm. in width. The pressure selected should be appropriate to the width of the opening in the slit nozzle. In the case of a slit nozzle in which the resistance against flow is comparatively small, 4–5 kg./cm.² is sufficient pressure. If the opening in the slit nozzle is very narrow, the resistance is greatly increased and a pressure of 10 kg./cm.² or more is required. If a very rapid film flow is obtained, the atmospheric pressure around the nozzle decreases measurably, causing air entrainment in the free-flowing film which in turn results in many bubbles in the film. This difficulty is overcome by maintaining the chamber containing the free-flowing film, including space surrounding the nozzle, under reduced pressure.

The rheological properties of the solution are also a factor in determining product quality. Using aqueous solutions, if the clearance of the slit nozzle is small, a free-flowing film of less than 0.1 mm. thickness is stable in the space more than 5 cm. removed from the mouth of the nozzle. With aqueous solutions there is some tendency to form colloidal white precipitates which are not lustrous and therefore not useful as nacreous pigments. To avoid the formation of these by-product colloidal precipitates, the free-flowing film should be as thin as possible. Unfortunately, the thin films are more unstable and to compensate against this instability, the addition of a very small amount of surfactant for reducing the surface tension is helpful. The film flow can also be stabilized by adding a very small amount of a water-soluble high polymer, which in low concentrations exhibits a string-drawing phenomenon. The high polymer substances act as networks along the film to keep the film intact until the drying operation is complete. Suitable high polymers exhibiting the string-drawing phenomenon include polyvinyl alcohol, methyl cellulose, carboxymethyl cellulose, alcoholic solutions of nitrocellulose and proteinaceous substances, such as albumin, gelatin, and the extract of the roots of *Hibiscus manihot* L. The high polymer substances should preferably be present in the solution in an amount ranging from 0.005–0.1 percent by weight. The addition of too much polymer causes, upon drying, the formation of a porous skeleton of titanium dioxide which, after calcination, does not produce any pearly effect.

The solvent is removed from the free-flowing film and a solid film is formed by heating the film to a temperature at which the solvent vaporizes, conveniently at or near the boiling point of the solvent. The heating of a free-flowing film moving at a comparatively low speed is accomplished by applying hot air or hot air in combination with infrared heat. In the case of very dilute aqueous solutions of titanium tetrachloride, a large amount of evaporation is required and therefore the heat source should be great enough to supply the required amount of heat. In the heating of thicker films, the use of a heat source of too high a temperature causes an undesirable boiling of the film solution, resulting in foaming and the formation of colloids. It is therefore desirable to maintain the temperature surrounding the free-flowing film below 160° C. Less difficulty is encountered in the heating of thinner films, because in the thinner film, the latent heat of evaporation of water can compensate for the rise in temperature within the film because of its smaller heat capacity until the film becomes completely dried.

After the solvent is evaporated and the free-flowing film is dried to a solid film, it is broken into particles either from the natural shrinkage or from the use of forced air, and collected in a suitable receptable. If undesirable colloidal precipitates are present, the product flakes can be easily separated by decantation from aqueous suspension. The product flakes are silvery in nature and are not sufficiently lustrous to be used as a nacreous pigment. The lustrous flakes or platelets are obtained by calcining the dried flakes at a temperature of 150 to 1100° C., preferably 400–1000° C., for a short period of time; e.g., from 5–30 minutes.

Because titanium dioxide has a greater refractive index than those of lead salts, it is capable of providing nearly three times the amount of luster for a given smooth optical thickness. Thus, particles having a comparatively high optical thickness, which would be rejected as valueless if they were made from lead salts, are acceptable if made from titanium compounds. The use of lead salts as nacreous pigments in thermoplastics can provide only weak luster because of the fragile nature of the crystals. Even the lesser grade titanium dioxide nacreous pigments obtained from aqueous solution according to the method of the invention can provide sufficient luster for use in thermoplastics with the additional improved characteristics of heat stability, sulfur resistance, and non-toxicity.

My invention is further illustrated by the following examples:

EXAMPLE I

An apparatus is assembled comprising a storage vessel, a dilution vessel, a mixer, a reservoir, a slit nozzle having an opening of 0.05 mm. in width, a heating chamber lined with infrared heaters, a fan, and a cyclone collector. An aqueous solution of titanium tetrachloride having a concentration of one percent by weight is prepared in the mixer by diluting a concentrated aqueous solution obtained from the storage vessel. The dilute titanium tetrachloride solution is forced under a pressure of 8 kg./cm.$^2$ through the slit nozzle to form a free-flowing film in the chamber adjoining the nozzle. As the film passes between the infrared heaters, it is contacted with a hot air stream at a temperature of 140° C. to evaporate the solvent and form a solid film, which disintegrates into flakes. The flakes are carried through an air channel into the cyclone collector and are thereafter calcined in a rotary kiln at a temperature of 800–1000° C. The resulting titanium dioxide pigment is a white powder having an optical thickness in excess of about 300 millimicrons. The pigment shows a silvery luster when rubbed and contains a small amount of nonlustrous colloidal by-product. When incorporated into various thermoplastic resins in a conventional manner, the nacreous titanium dioxide flakes give a pearly luster to the resins.

EXAMPLE II

The procedure of Example I is repeated, using a solution comprising 0.5 percent by weight titanium tetrachloride, 0.22 percent of polyvinyl alcohol, and 0.02 percent of polyoxyethylene alkyl ether surfactant to form the free-flowing film. A thinner film is produced and the resulting nacreous flakes or platelets are of higher quality than those obtained in Example I.

EXAMPLE III

An alcoholic solution of titanium tetrachloride is made by adding 2 parts of titanium tetrachloride slowly to 200 parts of ethanol. The hydrogen chloride vapor evolved is removed by means of suction. The solution is diluted with 200 parts of methanol and made to flow through a slit nozzle having an opening of 0.1 mm. in width under a pressure of 5 kg./cm.$^2$. Hot air at a temperature of 100° C. is applied instantaneously to both sides of the film to cause evaporation of the solution. The film solidifies, and is broken into flakes and collected as described in Example I. After calcination, there is obtained a golden iridescent nacreous pigment.

The amount of methanol added during the dilution step can be varied as desired within the range of 110–200 parts to obtain iridescent pigments having orange, pink, purple, and blue interference colors. For example, using 110 parts methanol, a bluish-green iridescent pigment is obtained.

EXAMPLE IV

A 50 percent butyl ester of titanate polymer solution in n-butanol is diluted 100 times with n-hexane. This solution is forced through a slit nozzle having an opening of 0.02 mm. in width under a pressure of 10 kg./cm.$^2$. The chamber surrounding the resulting free-flowing film is maintained under vacuum and heat is applied by infrared heaters to evaporate the solvent and form a solid film. The solid film moves in the vacuum at a high speed and is easily crushed into a fine powder. The flakes are collected by electrostatic attraction at the end of the channel. The collected flakes are calcined at 800° C. and the 5–10 micron fraction is separated from the smaller particles by an air sieve.

The resulting flakes are of the highest quality nacreous pigment for castings and coatings. The smaller flakes can be used directly for incorporation in thermoplastics and the 5–10 micron particles are crushed and classified to provide pigment having the desirable optical thickness of 30–100 millimicrons. All of the flakes obtained by this method show far better luster than the conventional nacreous pigments heretofore available.

I claim:
1. Method of making thin, lustrous flakes of titanium dioxide comprising forming a dilute solution containing between 0.1–5 percent by weight of a titanium compound selected from the group consisting of titanium tetrachloride and lower alkyl titanium esters in a volatile solvent, flowing said solution under pressure through a rectangular restriction to form a continuous thin, free-flowing film of less than 0.1 mm. in thickness, instantaneously applying heat to both sides of said film to heat said film to a temperature at which the solvent vaporizes to evaporate said solvent and form a solid film, breaking the solid film into particles, and calcining said particles to form thin lustrous flakes of titanium dioxide having an optical thickness of 30–1000 millimicrons.

2. Method according to claim 1 wherein said solvent is a lower alkanol.

3. Method according to claim 1 wherein said solvent is an aliphatic hydrocarbon solvent having a boiling point below 120° C.

4. Method according to claim 3 wherein said solvent is n-hexane.

5. Method according to claim 1 wherein said solvent is water.

6. Method according to claim 5 wherein the free-flowing film is stabilized by the presence of 0.05–1.0 percent by weight of a water-soluble high polymer exhibiting a string-drawing phenomenon.

7. Method according to claim 1 wherein the free-flowing film is heated to a temperature between the boiling point of the solvent and 160° C.

8. Method according to claim 1 wherein the dried particles are calcined at a temperature of 150–1100° C.

References Cited

UNITED STATES PATENTS

| | | | |
|---|---|---|---|
| 1,842,620 | 1/1932 | McInerny et al. | 23—202 |
| 2,186,135 | 1/1940 | Childs | 264—143 |
| 2,460,811 | 2/1949 | Davies et al. | 264—141 |
| 2,548,780 | 4/1951 | Gary et al. | 264—143 |
| 3,180,741 | 4/1965 | Wainer et al. | 23—140 |
| 3,213,170 | 10/1965 | Erdmenger et al. | 264—142 |
| 3,270,109 | 8/1966 | Kelsey | 23—202 X |
| 3,311,689 | 3/1967 | Kelsey | 264—210 |
| 3,340,006 | 9/1967 | Mochel | 23—202 X |

ROBERT F. WHITE, *Primary Examiner.*

S. I. LANDSMAN, *Assistant Examiner.*